Nov. 16, 1954     H. A. KENNEDY ET AL     2,694,745
STORAGE BATTERY
Filed Jan. 9, 1952     2 Sheets-Sheet 1

INVENTORS
HENRY A. KENNEDY AND
BY    FELIX REMUS

*Bean, Brooks, Buckley & Bean*
ATTORNEYS

Nov. 16, 1954     H. A. KENNEDY ET AL     2,694,745
STORAGE BATTERY
Filed Jan. 9, 1952     2 Sheets-Sheet 2
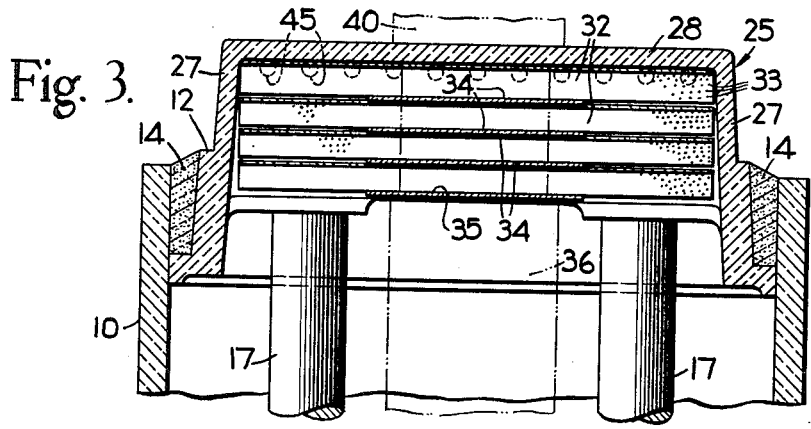
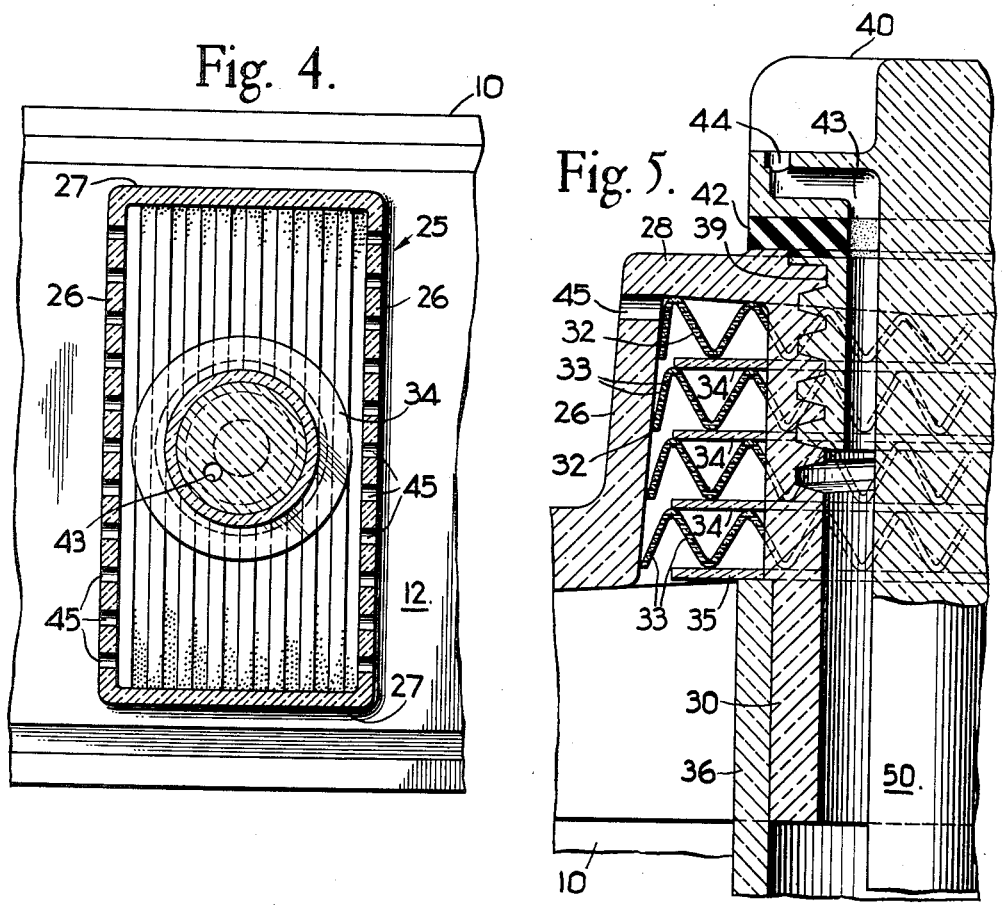
INVENTOR.
HENRY A. KENNEDY AND
BY    FELIX REMUS
Bean, Brooks, Buckley & Bean.
ATTORNEYS.

United States Patent Office 2,694,745
Patented Nov. 16, 1954

2,694,745

STORAGE BATTERY

Henry A. Kennedy, Philadelphia, Pa., and Felix Remus, Depew, N. Y., assignors to Gould-National Batteries, Inc.

Application January 9, 1952, Serial No. 265,565

7 Claims. (Cl. 136—177)

This invention relates to electric storage batteries, and more particularly to improvements in splash-proof and explosion-proof gas vent and filler opening closures therefor.

One of the objects of the invention is to provide in a storage battery an improved gas vent arrangement which obviates possibility of electrolyte leakage therefrom during handling or service use of the battery.

Another object of the invention is to provide an improved vent as aforesaid which also operates to so diffuse the venting hydrogen gas as to avoid explosive concentrations thereof.

Another object of the invention is to provide an improved vent device as aforesaid, and which is simple in construction and may be inexpensively fabricated by standard shop methods.

Still another object of the invention is to provide an improved vent as aforesaid which embodies no moving or fragile parts, and which is therefore rugged and always operable in the manner intended without maintenance attention.

Other objects and advantages of the invention will appear from the specification hereinafter.

In the drawings:

Fig. 3 is a fragmentary section, on an enlarged scale, taken along line III—III of Fig. 1;

Fig. 4 is a fragmentary section taken along line IV—IV of Fig. 2; and

Fig. 5 is a fragmentary section, on an enlarged scale, taken along line V—V of Fig. 1.

Figure 1:
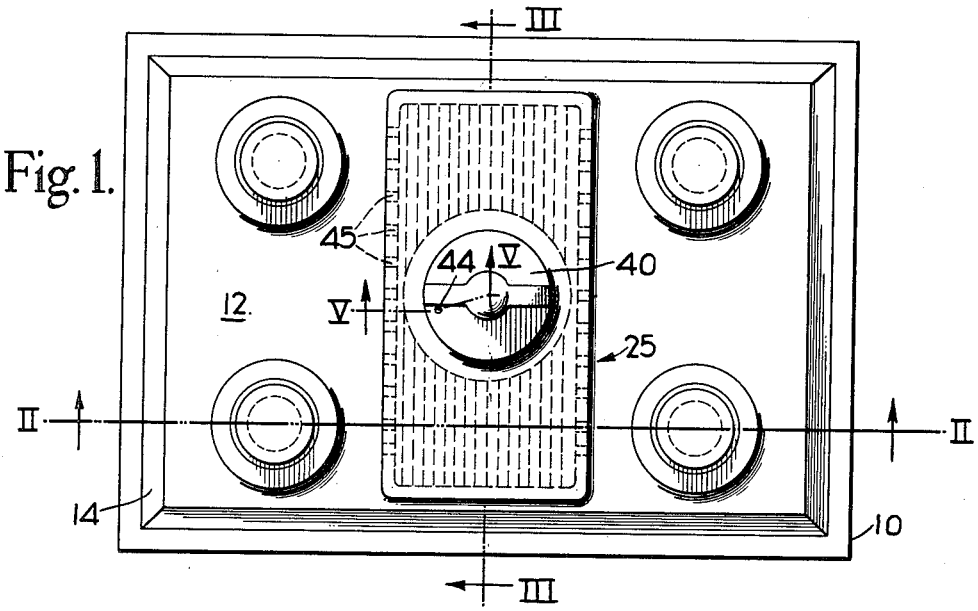
Fig. 1 is a top plan view of a storage battery embodying a filler opening and vent construction of the invention.

The invention is illustrated in the drawing as being embodied in an electric storage battery comprising generally a case 10 having a top cover 12 cemented therein as indicated at 14. The battery plates are indicated at 15—16 (Fig. 2) as being connected at their upper ends to opposite polarity cell posts 17—18 which at their upper ends are "burned" or welded to corresponding lead bushings 19—20 molded into the cover plate 12 for seepage-proof purposes, as is conventoinal in the battery art. The approximate operating "low" level of the battery cell electrolyte is indicated at 22.

The filler-vent device of the invention is illustrated as being incorporated within a "dome" or "superstructure" as indicated generally at 25 which is formed integrally with the top cover 12 of the same molded material. In the example illustrated herein the dome 25 is of generally rectangular plan form extended across the center of the battery, and having opposite side walls 26; end walls 27 and a roof or top wall 28. The roof 28 of the dome structure 25 is formed with a centrally disposed filler aperture in alignment with a dependent sleeve portion 30 which is also molded integrally with the roof portion 28 of the same acid-resistant material (Fig. 5). A series of baffle devices 32 are slip-fitted in vertically stacked relation within the dome structure 25; the baffles 32 being centrally apertured so as to slide freely around the sleeve 30 extending downwardly through the dome structure.

As shown in greater detail in Fig. 5, the baffle devices 32 each comprises a corrugated sheet formed of some suitable plastic material so as to be suitably acid-resistant; said sheets being minutely perforated as indicated at 33. The baffle devices 32 are maintained in superposed spaced relation by gaskets 34, and a bottom gasket 35 is arranged to provide vertical support for the stack of baffle devices within the dome structure by being in turn supported by an outer sleeve 36 which is welded or otherwise suitably affixed to enclose the lower end of the sleeve 30.

The sleeve 30 is internally threaded at its upper end as indicated at 39 (Fig. 5) to accommodate in screw-threaded relation therein a correspondingly threaded closure cap device 40; a soft rubber gasket or the like being provided as indicated at 42 for liquid sealing of the cell filling opening by the cap 40 when in closed position thereon. The outer sleeve 36 is dimensioned so as to extend downwardly below the operating range of the level of the electrolyte within the battery cell, and a small vent hole 43 is formed to extend upwardly through the cap device 40 to communicate with an outlet port 44 so as to permit hydrogen gas evolving from the electrolyte trapped within the sleeve 36 to escape through the port 44 when the cap 40 is in closed position. Adjacent the roof portion 28 of the dome structure 25, the side walls thereof are perforated as indicated at 45; and thus it will be appreciated that as hydrogen gas evolves from the electrolyte within the major portion of the battery cell it is enabled to escape upwardly through the perforations 33 of the stacked baffle sheets 32 and thence out through the vent openings 45. However, the baffle sheets 32 function efficiently at all times to prevent sloppage of the electrolyte solution up into the dome structure and out through the openings 45, while the tortuous shape of the small vent hole 43 and port 44 operate to prevent any sloppage of liquid from within the lower tube 36 up through the cap vent port.

It is another particular feature and advantage of the arrangement of the invention that the baffle structure within the dome 25 functions also to so diffuse the hydrogen gas evolving from the electrolyte that the gas is thereby prevented from concentrating to such a degree as to become an explosion hazard when the battery is operating in the presence of flames or other sparks or the like. It should be noted that the corrugated bent form of the baffle sheets 32 enable them to elastically conform to the lateral walls of the dome structure 25; and thus for example as shown in Fig. 5, even though the walls 26 incline from true vertical the ends of the baffle sheets 32 bear firmly against the walls to prevent leakage of liquid therearound.

Figure 2:
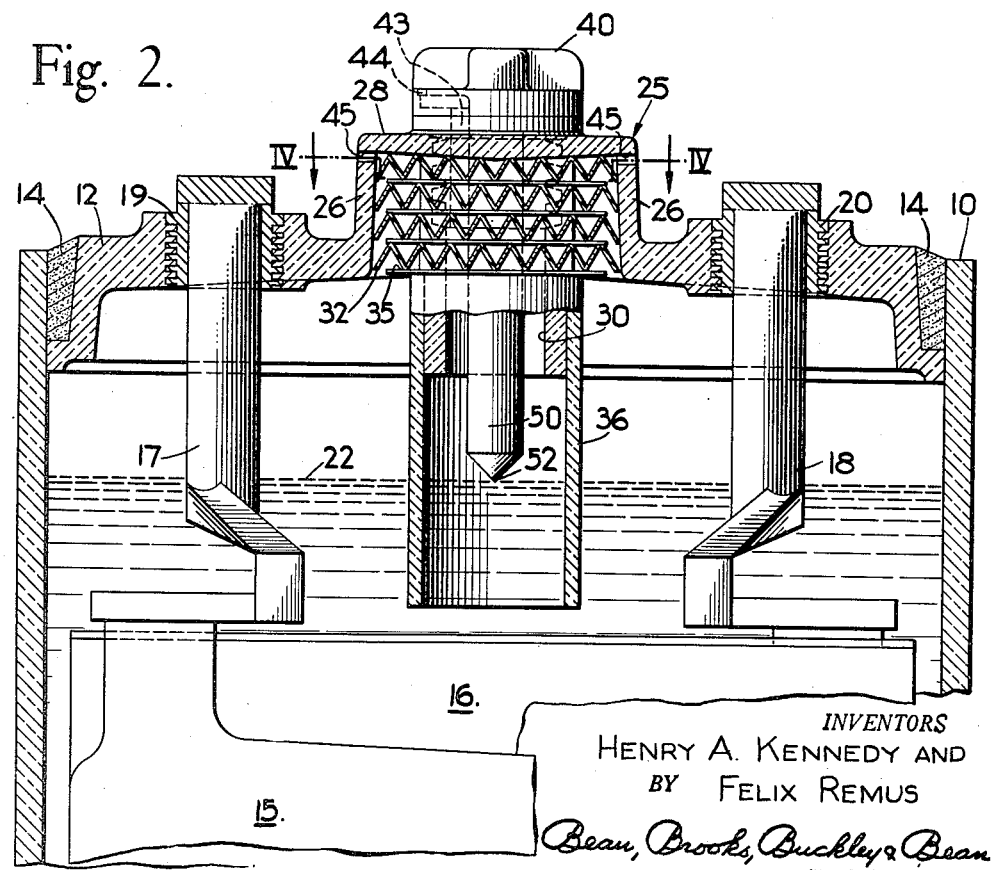
Fig. 2 is a fragmentary section, on an enlarged scale, taken along line II—II of Fig. 1.

Still another feature of the invention is that the baffle dome assembly construction thereof lends itself particularly to incorporation therein of an electrolyte level indicator of improved form. For example, as shown, the cap device 40 may be conveniently formed by molding it from a clear Lucite type plastic or some other such material having the property known as the ability to "pipe" light, while molding integrally therewith a downwardly extending stem portion 50 terminating in a conical point as indicated at 52 (Fig. 2). The stem 50 is so dimensioned and arranged that the point 52 thereof is disposed at the recommended low level for the electrolyte in the battery cell; while the inner sleeve 30 is dimensioned so that its lower end is at the recommended high level for the electrolyte in the cell. Thus, when the closure cap 40 is in place within the filler opening, whenever the battery cell electrolyte lowers beyond reach of the tip portion 52 of the stem 50, the light from externally of the battery entering through the top end of the cap portion 40 and being transmitted downwardly through the stem will reflect against the bottom conical surface thereof and rebound toward the top end of the cap device 40, thereby imparting to the latter a bright and crystal clear appearance.

Thus, the battery attendant is signalled to the effect that the battery liquid level is low. Then, when the cap is unscrewed and removed and water or acid, as the case demands, is poured into the battery through the tube 30 the level of electrolyte within the sleeve 36 will rise coincident with rising of the liquid level within the battery cell. However, when the level of liquid within the sleeve 36 reaches the bottom end of the inner sleeve 30, the reflected pouring sound from within the filler opening will suddenly change due to the abrupt change in diameter within the tube structure; thus signalling to the operator that the level of electrolyte within the battery cell has reached the recommended high level of liquid within the cell. It will of course be appreciated that as the electrolyte is being replenished within the battery cell the gas therein will readily vent upwardly through the vents 45 and the port 44.

Although only one form of the invention has been shown and described in detail, it will be apparent to those skilled in the art that the invention is not so limited but that various changes may be made therein without departing from the spirit of the invention or the scope of the appended claims.

What is claimed is:

1. In an electric storage battery, a cell case including a top cover portion, said top cover portion being molded to include centrally thereof an uprising dome structure having a filler opening therethrough, a first sleeve member in communication with said filler opening and extending integrally from the top wall portion of said dome structure downwardly into the battery cell and terminating at approximately the recommended high level of electrolyte therein, a filler opening closure device detachably connected at the upper end of said filler opening, a stack of baffle members disposed within said dome structure and each comprising a minutely perforated corrugated sheet dimensioned to extend horizontally within the dome structure between opposed side walls thereof, said baffle members being disposed within said dome structure in superposed relation, gas vent means formed through said dome structure adjacent the upper level thereof, a second sleeve fitted over the lower end of said first sleeve and fixed thereto and providing at its upper end a shoulder device bearing upwardly against said stack of baffle members for supporting the latter within said dome structure, said second sleeve terminating at its lower end below the recommended range of electrolyte level change within said cell, a vent opening through said closure device for venting gas from within said sleeve members, and a light transmitting rod extending through said closure device and downwardly through said sleeve devices and terminating in a conical formation at its lower end at the approximate recommended low level of electrolyte within said cell.

2. In an electric storage battery, a cell case having a top cover including an uprising dome structure having a filler opening therethrough, a tubular member connected to extend from said filler opening downwardly into the battery cell and terminating at approximately the recommended high level of electrolyte therein, a filler opening cap for detachably closing said filler opening, a stack of baffle members disposed within said dome structure and each comprising a perforated corrugated sheet extending horizontally within the dome structure between opposite side walls thereof, gas vent means through said dome structure, a sleeve fitted over the lower end of said tubular member and terminating at its lower end below the recommended range of electrolyte level change within said cell, and a gas vent opening through said cap device for venting gas from within said filler opening.

3. In an electric storage battery, a cell case including a top cover molded to include a dome structure having a filler opening therethrough, filler opening cap means for detachably closing said filler opening, a conduit member in communication with said filler opening and extending downwardly into the battery cell, a stack of baffle members disposed within said dome structure and each comprising a perforated sheet of corrugated form dimensioned to extend horizontally within the dome structure between opposite side walls thereof, said baffle members being disposed within said dome structure in superposed relation, gas vent means formed through said dome structure adjacent the upper level thereof, and gas vent means opening through said closure cap means for venting gas from within said filler opening.

4. In an electric storage battery, a cell case including a top cover dome structure having a filler opening therethrough, conduit means extending from said filler opening downwardly into the battery cell and terminating at approximately the recommended high level of electrolyte therein, a filler opening closure device for detachably closing said filler opening, a stack of baffle members disposed within said dome structure and each comprising a perforated sheet extending horizontally within the dome structure substantially from wall-to-wall thereof, said baffle members being disposed within said dome structure in superposed spaced relation, sleeve means around the lower end of said conduit means and terminating below the recommended range of electrolyte level change within said cell, gas vent means formed through said dome structure adjacent the upper level thereof in communication with said baffle members, and vent means opening through said closure device for venting gas from within said filler opening.

5. In an electric storage battery, a cell case including a top cover portion, said top cover portion having an uprising dome structure having a filler opening therethrough, first sleeve means in communication with said filler opening and extending from said dome structure downwardly into the battery cell and terminating at approximately the recommended high level of electrolyte therein, a filler opening closure device detachably connected at the upper end of said filler opening, a stack of baffle members disposed within said dome structure and each comprising a minutely perforated corrugated sheet dimensioned to extend horizontally within the dome structure between opposed side walls thereof, said baffle members being disposed within said dome structure in superposed relation about said first sleeve means, gas vent means formed through said dome structure adjacent the upper level thereof in communication with said baffle members, second sleeve means fitted over the lower end of said first sleeve means and terminating at its lower end below the recommended range of electrolyte level change within said cell, a vent opening through said closure device for venting gas from within said sleeve members, and a light transmitting rod extending through said closure device and downwardly through said sleeve means and terminating in a conical formation at its lower end at the approximate recommended low level of electrolyte within said cell.

6. In an electric storage battery cell, a cell case including a top cover dome structure having a filler opening therethrough, filler opening conduit means extending downwardly into the battery cell, a cap device for said filler opening, a stack of baffle members disposed within said dome structure and each comprising a perforated sheet apertured to receive said conduit means therethrough and extending horizontally within said dome structure substantially from wall-to-wall thereof, said baffle members being of corrugated bent form and disposed within said dome structure in superposed spaced relation to provide a tortuous path therethrough, gas vent means formed through said dome structure adjacent the upper level thereof in communication with said baffle members, and gas vent means opening through said cap device for venting gas from within said filler opening conduit means.

7. In an electrolyte cell, a cell case including a dome structure at the top thereof having a cell access opening therethrough, a cap device for detachably closing said access opening, conduit means extending downwardly from said access opening, baffle means disposed within said dome structure and including a perforated sheet of corrugated form apertured to receive said conduit means in slip-fitting relation therewith and disposed horizontally within said dome structure to extend substantially from wall-to-wall thereof, sleeve means secured to said conduit means and providing a shoulder supporting said perforated sheet, gas vent means formed through an upper wall portion of said dome structure, and gas vent means opening through said cap device for venting gas from within said conduit means.

References Cited in the file of this patent

UNITED STATES PATENTS

| Number | Name | Date |
| --- | --- | --- |
| 1,163,991 | Ford | Dec. 14, 1915 |
| 1,275,007 | Edgar | Aug. 6, 1918 |
| 1,363,645 | Gould | Dec. 28, 1920 |
| 1,883,971 | Kryzanowsky | Oct. 25, 1932 |
| 1,920,261 | Lavender | Aug. 1, 1933 |
| 2,264,902 | Hill | Dec. 2, 1941 |
| 2,480,861 | Jaworski et al. | Sept. 6, 1949 |
| 2,554,557 | Brown et al. | May 29, 1951 |

FOREIGN PATENTS

| Number | Country | Date |
| --- | --- | --- |
| 872,958 | France | June 25, 1942 |

OTHER REFERENCES

Publication "Railway Mechanical Engineer," pp. 588–589, "Battery Vent Plug," October 1949.